3,081,335
HYDROXYBENZYL CARBAMATES AND THIOCARBAMATES

Rupert C. Morris, Berkeley, and William J. Sullivan, Oakland, Calif., assignors to Shell Oil Company, New York, N.Y., a corporation of Delaware
No Drawing. Filed Sept. 19, 1960, Ser. No. 56,650
3 Claims. (Cl. 260—471)

This invention relates to new compositions of matter. More particularly, it relates to novel carbamates and thiocarbamates.

An object of this invention is that of providing new and useful dialkyl hydroxybenzyl N-arylcarbamates and N-arylthiocarbamates. Another object is to provide new and useful bis(dialkyl hydroxybenzyl) N,N'-aryl bis(carbamates); bis(carbamates; bis(dialkyl hydroxybenzyl) N,N'-aryl bis(thiocarbamates); tris(dialkyl hydroxybenzyl) N,N',N''-aryl tris(carbamates) and tris(dialkyl hydroxybenzyl) N,N',N''-aryl tris(thiocarbamates).

These and other objects will be apparent from the following description of the invention to one skilled in the art to which the invention pertains.

The novel compounds of the present invention may be referred to, generally, as urethans or thiourethans, that is, compounds obtained by reacting an alcohol with isocyanic or isothiocyanic acid. Most conveniently, the compounds of the present invention may be referred to as carbamates and thiocarbamates, that is, esters of carbamic and thiocarbamic acids, respectively, whereon one of the two hydrogen atoms attached to the nitrogen atom of the acid has been replaced with not more than one aryl radical. The compounds of the present invention may also be thought of as derivatives of the divalent carbamic and thiocarbamic radicals, that is, the divalent radicals having the formula

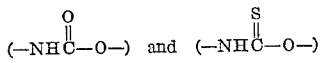

wherein an aryl radical is linked via a ring carbon atom directly to the nitrogen atom of said radicals, and a dialkyl hydroxybenzyl radical is linked via a methylene

bridge directly to the oxy (—O—) oxygen atom of said radicals.

These carbamates and thiocarbamates may be designated as 3,5-dialkyl-4-hydroxybenzyl N-arylthiocarbamates and N-arylthiocarbamates having the general formula

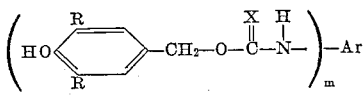

in which each R represents an alkyl radical containing from three to eight carbon atoms and is branched on each alpha carbon atom thereof, Ar represents an aryl radical, X represents a member selected from the group consisting of oxygen and sulfur atoms, and $m$ is an integer from 1 to 3, inclusive.

A preferred embodiment of this invention relates to carbamates and thiocarbamates, as above defined, in which each R represents a tertiary alkyl radical containing from four to six carbon atoms, Ar represents an aromatic hydrocarbon radical selected from the group consisting of phenyl, naphthyl, anthryl and phenanthryl radicals, X represents an oxygen atom, and $m$ is 1.

These carbamates and thiocarbamates may be readily prepared by methods known to the art. It is well known that alcohols generally will react with isocyanates or isothiocyanates to give the corresponding carbamate or thiocarbamate. This addition reaction involving carbamates and thiocarbamates of the present invention may be illustrated by the following equation:

in which R' represents a dialkyl hydroxybenzyl radical, Ar represents an aryl radical, X represents a member selected from the group consisting of oxygen and sulfur atoms, and $m$ is an integer from 1 to 3, inclusive, that is, $m$ is an integer which represents from 1 to 3 (XCN) groups, said groups being attached to different ring carbon atoms of the aryl radical.

In conducting the above process, the relative proportions of the two reactants can be varied. The actual addition reaction involves reaction among equimolar amounts of the two reactants when there is only one isocyanato or isothiocyanato group present in the arylisocyanate or arylisothiocyanate reactant. A molar ratio of 2:1 is necessary when there are two of the isocyanato or isothiocyanato groups present in the reactant, that is, alcohol over isocyanate or isothiocyanate, and 3:1 when there are three of said groups in the reactant. The reagents may be dissolved in a suitable solvent, e.g., anhydrous ether, and then brought together for the addition reaction. The reaction mixture is allowed to stand until the reaction is complete, the solvent evaporated off, and the desired carbamate or thiocarbamate obtained as the residual product. The carbamate or thiocarbamate may be obtained in relatively pure form by conventional methods, e.g., recrystallization from an ether-petroleum ether mixture. The reaction between the dialkyl hydroxybenzyl alcohol and arylisocyanate or arylisothiocyanate may be carried out at temperatures from about —10° C. to about 100° C. and under pressures ranging from subatmospheric to superatmospheric. It is preferable to carry the reaction out at a temperature between about 0° to about 20° and under atmospheric pressure. It is preferable that the reagents, and any solvents employed, be as dry as possible as water may react with the arylisocyanate or arylisothiocyanate reagent to give the corresponding symmetrical diaryl urea or diaryl thiourea as a by-product. The preparation of the carbamates and thiocarbamates of the invention are set out in detail in the accompanying example.

Representative alcohols which may be reacted with an arylisocyanate or arylisothiocyanate to prepared the carbamates and thiocarbamates of the invention are the dialkyl hydroxybenzyl alcohols such as, for example, 3-tert-butyl-5-isopropyl-4-hydroxybenzyl alcohol; 3,5-diisopropyl-4-hydroxybenzyl alcohol; 3,5-di-tert-butyl-4-hydroxybenzyl alcohol; 3,5-di-sec-butyl-4-hydroxybenzyl alcohol; 3,5 - dicyclohexyl-4-hydroxybenzyl alcohol; 3,5-di-tert-amyl-4-hydroxybenzyl alcohol; 3,5-di-sec-octyl-4-hydroxybenzyl alcohol; and the like. These dialkyl hydroxybenzyl alcohols represented by R'OH in the above equation may be prepared by methods known to the art, for example, the method disclosed by Coppinger and Campbell in JACS 75:734-736 (1953).

The dialkyl hydroxybenzyl alcohols used in this invention possess one free phenolic hydroxyl group on the number 4-ring position of the benzyl group. Furthermore, the phenolic hydroxyl group is sterically hindered by two adjacent alkyl groups on the 3- and 5-ring positions of the benzyl group, both of which are branched on the alpha carbon atom thereof. The ring positions are numbered from the ring carbon atom attached to the methylene bridge (—CH₂—).

Representative arylisocyanates and arylisothiocyanates which may be reacted with the above dialkyl hydroxybenzyl alcohols to prepare the carbamates and thiocarbamates of the invention are the arylisocyanates and arylisothiocyanates such as, for example, phenylisocyanate; p-phenylenediisocyanate; 1,3,5 - benzenetriisocyanate; phenylisothiocyanate; p-phenylenediisothiocyanate; 1,3, 5-benzenetriisothiocyanate; alpha-naphthylisocyanate; 3-naphthylisocyanate; alpha,alpha'-naphthylenediisocyanate; beta,beta'-naphthylenediisocyanate; 1,3,5-tris(isocyanato)naphthalene; alpha-naphthylisothiocyanate; beta-naphthylisothiocyanate; alpha,alpha'-naphthylenediisothiocyanate; beta,beta'-naphthylenediisothiocyanate; 1,3,5-tris(isothiocyanato)naphthalene; 1-anthrylisocyanate; 10-anthrylisocyanate; 6-anthrylisocyanate; 1,3-anthrylenediisocyanate; 9,10-anthrylenediisocyanate; 1,3,10-tris(isocyanato)anthracene; 1,8,10-tris(isocyanato)anthracene; 1-anthrylisothiocyanate; 8-anthrylisothiocyanate; 1,4-anthrylenediisothiocyanate; 5,8-anthrylenediisothiocyanate; 1,8,10-tris(isothiocyanato)anthracene; 1-phenanthrylisocyanate; 1,3-phenanthrylenediisocyanate; 5,7,9-tris(isocyanato)phenanthrene; 2-phenanthrylisothiocyanate; 8,10-phenanthrylenediisothiocyanate; 1,3,5-tris(isothiocyanato)phenanthrene; p-phenyl phenylisocyanate; 4-phenyl-1,3-benzenediisocyanate; 4-phenyl-1,3,5-benzenetriisocyanate; p-phenyl phenylisothiocyanate; 4-phenyl-1,3-benzenediisothiocyanate; 4-phenyl-1,3-5-benzenetriisothiocyanate; 4,4'-biphenyldiisocyanate; 2,2',4,4'-biphenyltetraisocyanate; 2,2',4,4',6,6'-biphenylhexaisocyanate; 4,4'-biphenyldiisothiocyanate; 2,2',4,4'-biphenyltetraisocyanate; 2,2',4,4',6,6'-biphenylhexaisothiocyanate; and the like.

The aryl portion of the isocyanates and isothiocyanates consists of aryl radicals containing only carbon atoms in an aromatic hydrocarbon ring system and not more than a total of fourteen ring carbon atoms in each aryl radical. The aryl radicals may be fused aromatic ring systems such as, for example, naphthylene, or aromatic chain ring systems such as, for example, biphenyl. Each aryl radical may contain up to three isocyanato (OCN) or isothiocyanato (SCN) radicals such as, for example, 1,3,5-tris(isocyanato)benzene; 1,3,5-tris(isothiocyanato)benzene; and the like. The representative arylisocyanates and arylisothiocyanates utilized in this invention may bear one or more simple substituents on the aryl portion of the compound such as, for example, alkyl, alkoxy, nitro, amino, halo and the other simple substituents which do not adversely affect the reactivity with the substituted benzyl alcohol reactant. Specific examples of simple substituted arylisocyanates and arylisothiocyanates include, for example, p-nitrophenylisocyanate; p-methoxyphenylisocyanate; p-dimethylaminophenylisocyanate; p-chlorophenylisocyanate; p-methylphenylisothiocyanate; alpha-ethyl-alpha'-isocyanatonaphthalene; 1-ethoxy-4-isothiocyanatoanthracene; 1-nitro-3-isothiocyanatophenanthrene; 3,3'-dimethyldiphenylmethane 4,4'-diisocyanate; 2,4-tolylene diisocyanate; 2,6-tolylenediisocyanate; 3,3'-bitolylene 4,4-diisocyanate; diphenylmethane 4,4'-diisocyanate; and the like.

The arylisocyanates, represented by the formula $(XCN)_m$—Ar in the above equation, in which X is an oxygen atom, may be prepared by methods known to the art. For example, an arylamine will react with phosgene to give the corresponding arylisocyanate. The arylisothiocyanates, represented by the formula $(XCN)_m$—Ar in the above equation, in which X is a sulfur atom, may be prepared by reacting an arylamine with carbon disulfide and concentrated ammonium hydroxide to obtain the corresponding ammonium aryldithiocarbomate. The resultant ammonium aryldithiocarbamate is then reacted with lead nitrate to give the corresponding arylisothiocyanate.

Although this invention is specifically directed toward novel arylcarbamates and arylthiocarbamates, it may be seen by those skilled in the art that novel alkylcarbamates and alkylthiocarbamates may likewise be prepared such as, for example, 3,5-di-tert-butyl-4-hydroxybenzyl N-methylcarbamate; 3,5-di-tert-butyl-4-hydroxybenzyl N-ethylcarbamate; 3,5-di-tert-butyl-4-hydroxybenzyl N-ethylthiocarbamate; 3,5-di-tert-butyl-4-hydroxybenzyl N-propylcarbamate; 3,5-di-tert-butyl-4-hydroxybenzyl N-n-butyl carbamate; 3,5-di-tert-butyl-4-hydroxybenzyl N-n-butylthiocarbomate; bis(3,5-di-tert-butyl-4-hydroxybenzyl) N,N'-1,3-propylenebiscarbamate; bis(3,5-di-tert-butyl-4-hydroxybenzyl) N,N'-1,3-propylenebisthiocarbamate; and the like.

The compounds of the present invention find important utility in the field of antioxidants. They are useful as antioxidants for organic materials normally subject to oxidative deterioration. The compounds of the present invention may be added to, or blended with, such materials as, for example, natural and synthetic rubber, polymers, fatty oils, gasoline, motor oils, turbine oils, transformer oils, diesel oils, lubricating oils, asphalt, paints, foods, paper, and so forth, to retard oxidative deterioration. For example, 3,5-di-tert-butyl-4-hydroxybenzyl-N-phenylcarbamate will stabilize polypropylene, that is, the polypropylene is more resistant to oxidative deterioration when a small quantity of 3,5-di-tert-butyl-4-hydroxybenzyl-N-phenylcarbamate antioxidant is added to the polypropylene. The amount of antioxidant which may be added to the material to be protected from oxidative deterioration varies from about 0.0001% by weight, based on the material, to about 10% by weight on the same basis. More or less than the above amounts of the antioxidant may be employed depending upon the antioxidant used, the nature of the material to be protected, and the environment in which the antioxidant and material find themselves.

The carbamates and thiocarbamates of this invention and their preparation are ilustrated by the following specific example. It is to be understood, however, that the example is merely illustrative and is not to be regarded as limiting, since the basic teaching therein may be varied at will as will be understood by one skilled in the art to which this invention pertains.

*Example 1.—3,5-Di-Tert-Butyl-4-Hydroxybenzyl-N-Phenylcarbamate*

To a solution of 11.8 grams (0.05 mole) of 3,5-di-tert-butyl-4-hydroxybenzyl alcohol dissolved in 150 ml. of anhydrous ether was added 5.9 grams (0.05 mole) of phenylisocyanate dissolved in 50.0 ml. of anhydrous ether. The reaction mixture was allowed to stand at room temperature over night. The ether was evaporated to give 17.8 grams of product. The product was washed with petroleum ether and was found to have a fairly sharp melting point at 108° C. On recrystallization of the product from petroleum ether-diethyl ether solution, 15.2 grams (96% yield) of a white crystaline product with a melting point of 128–129° C. was obtained. Upon analysis the product was found to be 3,5-di-tert-butyl-4-hydroxybenzylphenylcarbamate.

| | C | H | N |
|---|---|---|---|
| Calculated for $C_{22}H_{29}O_3N$ (M. W. 355.46) | 74.3 | 8.22 | 3.94 |
| Found | 74.3 | 8.2 | 4.23 |

Other carbamates and thiocarbamates which may be prepared in a manner similar to the preparation of Example I include, for example, 3,5-di-tert-butyl-4-hydroxybenzyl N-alpha'-naphthylcarbamate;

3,5-di-tert-butyl-4-hydroxybenzyl N-alpha-anthrylcarbamate;

3,5-di-tert-butyl-4-hydroxybenzyl N-phenylthiocarbamate;

3,5-di-tert-butyl-4-hydroxybenzyl N-alpha-naphthylthiocarbamate;

3,5-di-tert-butyl-4-hydroxybenzyl N-alpha-anthrylthiocarbamate;

3,5-di-tert-butyl-4-hydroxybenzyl N-1-phenanthrylthiocarbamate;

bis(3,5-di-tert-butyl-4-hydroxybenzyl) N,N'-1,4-phenylenebisthiocarbamate;

tris(3,5 - di-tert-butyl-4-hydroxybenzyl) N,N',N''-1,3,5-benzene tris(carbamate);
bis(3,5-di-tert-butyl-4-hydroxybenzyl) N,N'-alpha,alpha'-naphthylene bis(carbamate);
tris(3,5-di-tert-butyl-4-hydroxybenzyl) N,N',N''-1,3,5-tris(isocyanato)naphthalene;
bis(3,5-di-tert-butyl-4-hydroxybenzyl) N,N'-alpha,alpha'-naphthylene bis(thiocarbamate);
tris(3,5 - di-tert-butyl-4-hydroxybenzyl) N,N',N'' - 1,3,5-tris(isothiocyanato)naphthalene;
bis(3,5-di-tert-butyl-4-hydroxybenzyl) N,N'-1,3-anthrylene bis(carbamate);
tris(3,5-di-tert-butyl-4-hydroxybenzyl) N,N',N''-tris(isocyanato)anthracene;
bis(3,5-di-tert-butyl-4-hydroxybenzyl) N,N'-1,3-(isothiocyanato)anthracene;
tris(3,5-di-tert-butyl-4-hydroxybenzyl) N,N',N'' - 1,8,10-tris(isothiocyanato)anthracene;
3,5-di-tert-butyl-4-hydroxybenzyl N-biphenylcarbamate;
bis(3,5-di-tert-butyl-4-hydroxybenzyl) N,N'-1,4-biphenylene bis(carbamate);
and the like.

We claim as our invention:
1. A carbamate of the formula

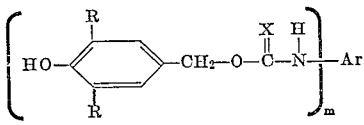

wherein each R is alkyl of from 3 to 8 carbon atoms branched on the alpha carbon atom, X is a member of the group consisting of oxygen and sulfur, $m$ is an integer from 1 to 3, inclusive, and Ar is aromatic hydrocarbon of up to 14 carbon atoms.

2. A compound in accordance with claim 1, wherein each R is tertiary butyl, X is oxygen, and Ar is aromatic hydrocarbon of 6 carbon atoms.

3. 3,5-di-tert-butyl-4-hydroxybenzyl N - phenylcarbamate.

References Cited in the file of this patent
UNITED STATES PATENTS

| | | |
|---|---|---|
| 2,026,618 | Etzelmiller | Jan. 17, 1936 |
| 2,677,698 | Deutschmann et al. | May 4, 1954 |
| 2,757,174 | Hardman | July 31, 1956 |
| 2,806,051 | Brockway | Sept. 10, 1957 |
| 2,945,877 | Zima et al. | July 19, 1960 |
| 2,972,597 | Newland et al. | Feb. 21, 1961 |
| 2,983,709 | Newland et al. | May 9, 1961 |

OTHER REFERENCES

Coppinger et al.: J. Am. Chem. Soc., vol. 75, page 736 (1953).